(12) United States Patent
Xie et al.

(10) Patent No.: US 9,311,538 B2
(45) Date of Patent: Apr. 12, 2016

(54) METHOD AND APPARATUS FOR SEMI-AUTOMATIC FINGER EXTRACTION

(71) Applicant: FUJITSU LIMITED, Kawasaki-shi (JP)

(72) Inventors: Shufu Xie, Beijing (CN); Yuan He, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 66 days.

(21) Appl. No.: 14/174,003

(22) Filed: Feb. 6, 2014

(65) Prior Publication Data
US 2014/0226856 A1 Aug. 14, 2014

(30) Foreign Application Priority Data
Feb. 6, 2013 (CN) .......................... 2013 1 0048270

(51) Int. Cl.
*G06K 9/00* (2006.01)
*G06K 9/46* (2006.01)
*G06K 9/34* (2006.01)
*H04N 5/225* (2006.01)

(52) U.S. Cl.
CPC ............ *G06K 9/00624* (2013.01); *G06K 9/346* (2013.01); *G06K 9/4604* (2013.01); *G06K 2209/01* (2013.01)

(58) Field of Classification Search
CPC .................................... G06K 9/00; G06F 3/00
USPC ........... 382/103, 107, 236; 348/169–172, 352
See application file for complete search history.

(56) References Cited

U.S. PATENT DOCUMENTS 6,624,833 B1* 9/2003 Kumar .................... G06F 3/017
345/156
2012/0268364 A1* 10/2012 Minnen ......................... 345/156

* cited by examiner

*Primary Examiner* — Abolfazl Tabatabai
(74) *Attorney, Agent, or Firm* — Staas & Halsey LLP

(57) ABSTRACT

An image processing device includes: an inputting unit for performing a click on an object image contained in an image to obtain a clicked point; a calculating unit for calculating an edge map of the image; an estimating unit for estimating a color model of the object image based on the clicked point and the edge map; an object classifying unit for classifying each pixel in the image, based on the edge map and the color model, so as to obtain a binary image of the image; and a detecting unit for detecting a region containing the object image based on the binary image. The image processing device and method according to the present disclosure can improve the accuracy of detecting the boundary of an object image such as a finger image, thus facilitating removal of the object image from the image and making the processed image more nice-looking.

15 Claims, 7 Drawing Sheets

METHOD AND APPARATUS FOR SEMI-AUTOMATIC FINGER EXTRACTION

FIELD OF THE INVENTION

The present disclosure relates to the field of image processing, particularly to a device and a method for detecting the boundary of an object image such as a finger image.

BACKGROUND OF THE INVENTION

This section provides background information relating to the present disclosure, which is not necessarily prior art.

When scanning a book using an overhead scanner, for example, the user may hold both sides of the book with his/her fingers to complete the scanning process. The fingers may appear on the side boundaries of the book in the corrected scanned image of the book, making the corrected image less nice-looking. Therefore, it is necessary to remove the finger image in the corrected image.

In order to remove the finger image, generally two steps are to be taken: first, detecting the finger region; and secondly, removing the finger region. Clearly, automatic finger region detection and removal are useful. However, considering the variety of types of book contents and the possibility that the fingers may get to the book content, it is difficult to correctly detect the finger region.

SUMMARY OF THE INVENTION

This section provides a general summary of the present disclosure, and is not a comprehensive disclosure of its full scope or all of its features.

An object of the present disclosure is to provide an image processing device and an image processing method, which can improve the accuracy of detecting the boundary of an object image such as a finger image, thus facilitating removal of the object image from the image and making the processed image more nice-looking.

According to an aspect of the present disclosure, there is provided an image processing device including: an inputting unit for performing a click on an object image contained in an image to obtain a clicked point; a calculating unit for calculating an edge map of the image; an estimating unit for estimating a color model of the object image based on the clicked point and the edge map; an object classifying unit for classifying each pixel in the image, based on the edge map and the color model, so as to obtain a binary image of the image; and a detecting unit for detecting a region containing the object image based on the binary image.

According to another aspect of the present disclosure, there is provided an image processing method including: performing a click on an object image contained in an image to obtain a clicked point; calculating an edge map of the image; estimating a color model of the object image based on the clicked point and the edge map; classifying each pixel in the image, based on the edge map and the color model, so as to obtain a binary image of the image; and detecting a region containing the object image based on the binary image.

According to another aspect of the present disclosure, there is provided a program product including machine-readable instruction code stored therein which, when read and executed by a computer, causes the computer to perform the image processing method according to the present disclosure.

According to another aspect of the present disclosure, there is provided a machine-readable storage medium carrying the program product according to the present disclosure thereon.

The image processing device and method according to the present disclosure require user interaction to obtain information on the clicked point. Further, the image processing device and method according to the present disclosure use color information and edge information to detect the boundary of an object image such as a finger image. Accordingly, the image processing device and method according to the present disclosure can improve the accuracy of detecting the boundary of an object image, thus facilitating removal of the object image from the image and making the processed image more nice-looking.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. In the drawings.

Figures 1A, 1B:
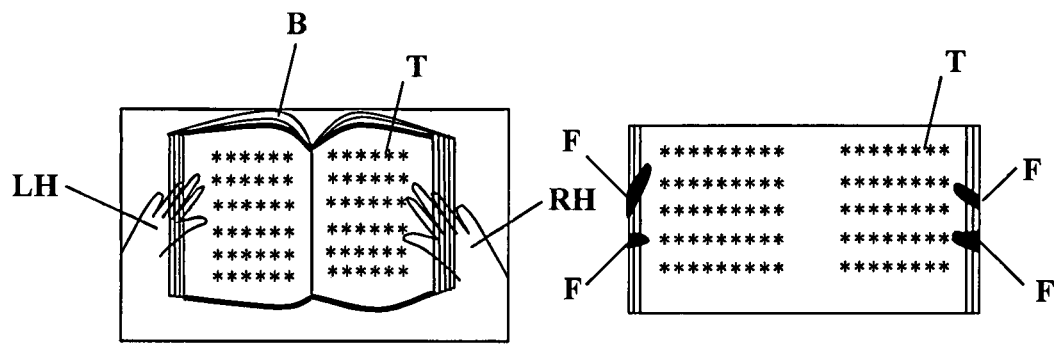
FIGS. 1(*a*) and 1(*b*) are schematic diagrams illustrating an exemplary image to be dealt with by the technical solution of the present disclosure.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corre-

DETAILED DESCRIPTION OF THE EMBODIMENTS

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

FIGS. 1(a) and 1(b) are schematic diagrams illustrating an exemplary image to be dealt with by the technical solution of the present disclosure. When scanning a book B using an overhead scanner, for example, the user may hold both sides of the book with the fingers of his/her left hand LH and right hand RH to complete the scanning process, thus obtaining an image as shown in FIG. 1(a). Known methods in the prior art may be used to correct the obtained image. For example, the upper and lower boundaries of the image may be extracted, and then transformed from curved into flat so as to obtain the corrected image. FIG. 1(b) shows an example of the corrected image. As shown in FIG. 1(b), in the corrected scanned image of the book, a finger image F may appear on the side boundaries of book, and the finger image F may get to book content T, making the corrected image less nice-looking. Therefore, it is necessary to remove the finger image F from the corrected image.

In order to remove the finger image F, generally two steps are to be taken: first, detecting the finger region; and secondly, removing the finger region. By using the technical solution of the present disclosure, the accuracy of detecting the finger region as shown in FIG. 1(b) can be improved, thus facilitating removal of the finger region and making the corrected scanned image of the book more nice-looking.

Figure 2:
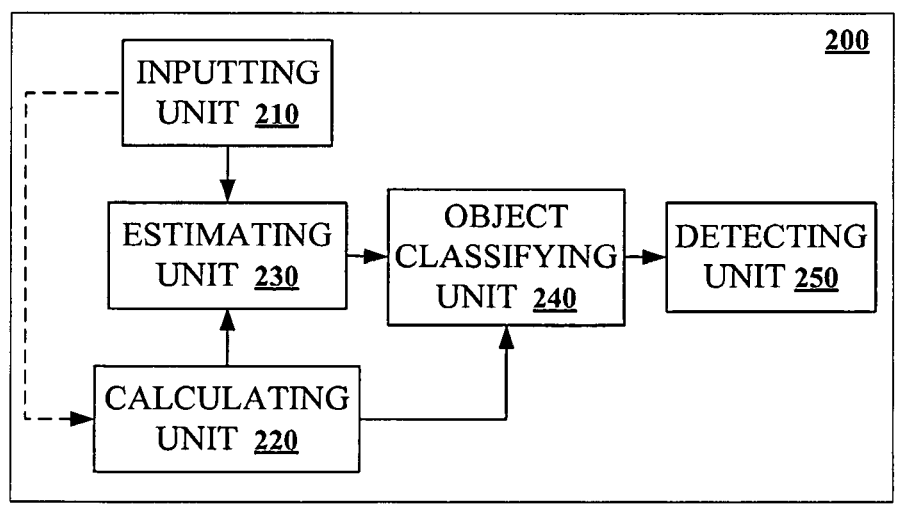
FIG. 2 is a block diagram illustrating an image processing device according to an embodiment of the present disclosure.

As shown in FIG. 2, the image processing device 200 according to an embodiment of the present disclosure may include an inputting unit 210, a calculating unit 220, an estimating unit 230, an object classifying unit 240, and a detecting unit 250.

Figure 3:
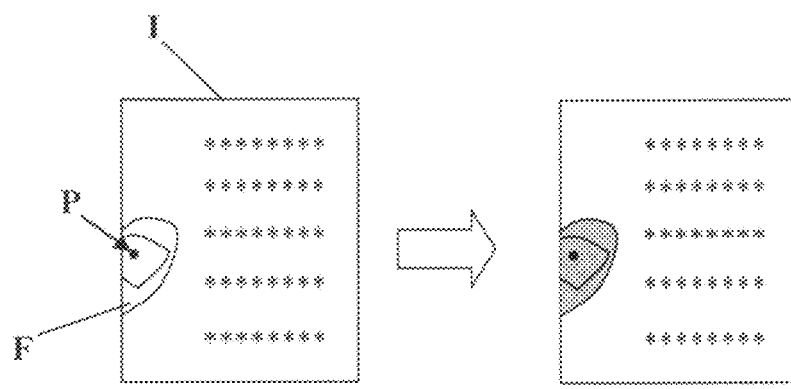
FIG. 3 is a schematic diagram illustrating an exemplary application of the image processing device according to the embodiment of the present disclosure.

The inputting unit 210 may click on an object image contained in an image to obtain a clicked point. For example, as shown in the left of FIG. 3, on an image I cropped from the corrected image containing the finger image F, the inputting unit 210 may perform a click on the finger image F to obtain a clicked point P. In this way, it is clear that the clicked point P is within the finger region. The inputting unit 210 may be any device that can perform click function, e.g. a mouse, and the present disclosure has no particular limitations thereto.

The calculating unit 220 may calculate an edge map of the image I. The edge map is a map in relation to edge information of the image I. The edge information indicates whether a pixel in the image I is an edge pixel or not. The calculating unit 220 may calculate the edge map based on pixel information of the image I and information of the clicked point P obtained by the inputting unit 210, or calculate the edge map based on the pixel information of the image I only. This will be described later in detail.

The estimating unit 230 may estimate a color model of the finger image (object image) F based on the clicked point P obtained by the inputting unit 210 and the edge map calculated by the calculating unit 220.

Further, the object classifying unit 240 may classify each pixel in the image I, based on the edge map calculated by the calculating unit 220 and the color model estimated by the estimating unit 230, so as to obtain a binary image of the image I. In the binary image, each pixel in the image I is simply classified as a finger (object) pixel or a non-finger (non-object) pixel.

Further, the detecting unit 250 may detect a region containing the finger image F based on the binary image obtained by the object classifying unit 240. Ideally, as shown in the right of FIG. 3, the finger region represented with a shaded background may be obtained.

In the image processing device 200 according to the embodiment of the present disclosure, both the color model of the finger image and the edge map of the image are used to obtain the binary image of the image. Further, both the information on the clicked point and the edge map of the image are used to estimate the color model of the finger image. Therefore, the accuracy of detecting the finger region can be greatly improved, thus facilitating removal of the finger image from the image and making the processed image more nice-looking.

In order to provide a better understanding of the technical solution of the present disclosure, the components of the image processing device 200 shown in FIG. 2 are described below in more detail.

Figure 4:
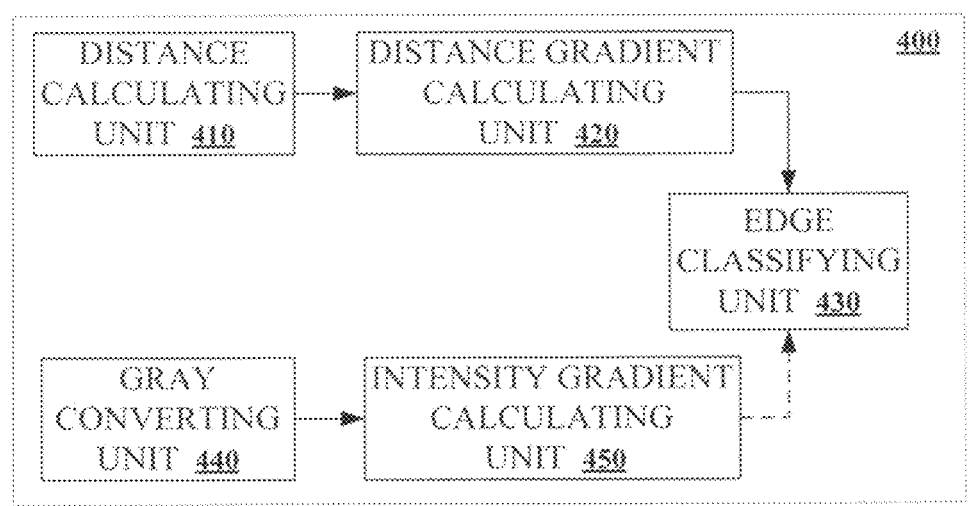
FIG. 4 is a block diagram illustrating a calculating unit in the image processing device according to the embodiment of the present disclosure.

FIG. 4 is a block diagram illustrating a calculating unit 400 in the image processing device according to the embodiment of the present disclosure. The calculating unit 400 shown in FIG. 4 corresponds to the calculating unit 220 shown in FIG. 2.

The calculating unit 400 may include a distance calculating unit 410, a distance gradient calculating unit 420, and an edge classifying unit 430.

The distance calculating unit 410 may calculate the distance between the color of each pixel in the image I (see FIG. 3) and the color of the clicked point P to obtain a distance map. The color of the clicked point P may be the color of the pixel at the clicked point P, or may be an average color of pixels within a predetermined region containing the clicked point P.

Specifically, assuming that the width and height of the image I are $w_0$ and $h_0$ respectively, the coordinates of the clicked point P in the image I are $(x_{click}, y_{click})$, and the color of the clicked point P is represented by $color_{click} = (r_{click}, g_{click}, b_{click})$, where $r_{click}, g_{click}$ and $b_{click}$ are R, G and B values of the color of the clicked point P, respectively. The distance calculating unit 410 may calculate the distance between the color of each pixel $(x_i, y_i)$ in the image I, $color_{xi, yi}$, and the color of the clicked point P, $color_{click}$, according to the equation (1):

$$dist_{i,j} = |color_{xi,yi} - color_{click}|, 1 \leq y_i \leq h_0, 1 \leq x_i \leq w_0 \quad (1)$$

In this way, the distance map of the image I can be obtained.

Further, the distance gradient calculating unit 420 may apply a gradient operator (e.g., Sobel operator) to the distance map obtained by the distance calculating unit 410 to obtain a distance gradient image $Grad_{click}$. The methods for calculating a gradient image are well-known in the prior art, and thus omitted herein.

Further, based on the distance gradient image $Grad_{click}$ obtained by the distance gradient calculating unit 420, the edge classifying unit 430 may classify pixels having a distance gradient larger than a predetermined distance gradient threshold in the image I as edge pixels, and the other pixels in the image I as non-edge pixels, thereby obtaining an edge map of the image I. Particularly, the edge classifying unit 430 may obtain the edge map of the image I according to the equation (2):

$$Edge_{click}(x_i, y_i) = \begin{cases} 0, & \text{if } Grad_{click}(x_i, y_i) > T_{click} \\ 255, & \text{else} \end{cases} \quad (2)$$

where $T_{click}$ denotes the predetermined distance gradient threshold, $Grad_{click}(x_i, y_i)$ denotes the distance gradient between a pixel $(x_i, y_i)$ and the clicked point P, and $Edge_{click}(x_i, y_i)$ denotes edge information on whether the pixel $(x_i, y_i)$ is an edge pixel or a non-edge pixel. Specifically, the edge pixels are assigned with the value 0, and the non-edge pixels are assigned with the value 255. In this way, the calculating unit 400 obtains the edge map of the image I.

According to a preferred embodiment of the present disclosure, the calculating unit 400 may further include a gray converting unit 440 and an intensity gradient calculating unit 450. The gray converting unit 440 may convert the image I from a color image into a gray image. The intensity gradient calculating unit 450 may apply a gradient operator (e.g., Sobel operator) to the gray image to obtain an intensity gradient image. The methods for converting a color image into a gray image and the methods for calculating an intensity gradient image are well-known in the prior art, and thus omitted herein.

In this case, the edge classifying unit 430 may classify pixels having a distance gradient larger than a predetermined distance gradient threshold or having an intensity gradient larger than a predetermined intensity gradient threshold in the image I as edge pixels, and the other pixels in the image I as non-edge pixels, based on the distance gradient image obtained by the distance gradient calculating unit 420 and the intensity gradient image obtained by the intensity gradient calculating unit 450, thus obtaining an enhanced edge map of the image I. Particularly, the edge classifying unit 430 may obtain the enhanced edge map of the image I according to the equation (3):

$$Edge_{enhance}(x_i, y_i) = \quad (3)$$
$$\begin{cases} 0, & \text{if } Grad_{click}(x_i, y_i) > T_{click} \text{ or } Grad_{intensity}(x_i, y_i) > T_{intensity} \\ 255, & \text{else} \end{cases}$$

where $T_{intensity}$ denotes the predetermined intensity gradient threshold, $Grad_{intensity}(x_i, y_i)$ denotes the intensity gradient of a pixel $(x_i, y_i)$, and $Edge_{enhance}(x_i, y_i)$ denotes enhanced edge information on whether the pixel $(x_i, y_i)$ is an edge pixel or a non-edge pixel. Specifically, the edge pixels are assigned with the value 0, and the non-edge pixels are assigned with the value 255. In this way, the calculating unit 400 obtains the enhanced edge map of the image I.

Because the distance gradient image and intensity gradient image of the image I are complementary to a certain degree, the calculating unit 400 can detect the boundary of the finger image more completely by means of the information of both images.

It is noted that the calculating unit 400 may as well include only the gray converting unit 440, the intensity gradient calculating unit 450, and the edge classifying unit 430, without the distance calculating unit 410 and the distance gradient calculating unit 420. In this case, the edge classifying unit 430 may classify pixels having an intensity gradient larger than a predetermined intensity gradient threshold in the image I as edge pixels, and the other pixels in the image I as non-edge pixels, based on the intensity gradient image obtained by the intensity gradient calculating unit 450, thus obtaining the edge map of the image I. In this case, the calculating unit 400 calculates the edge map based on pixel information of the image I only, without using the information on the clicked point P.

Figure 5:
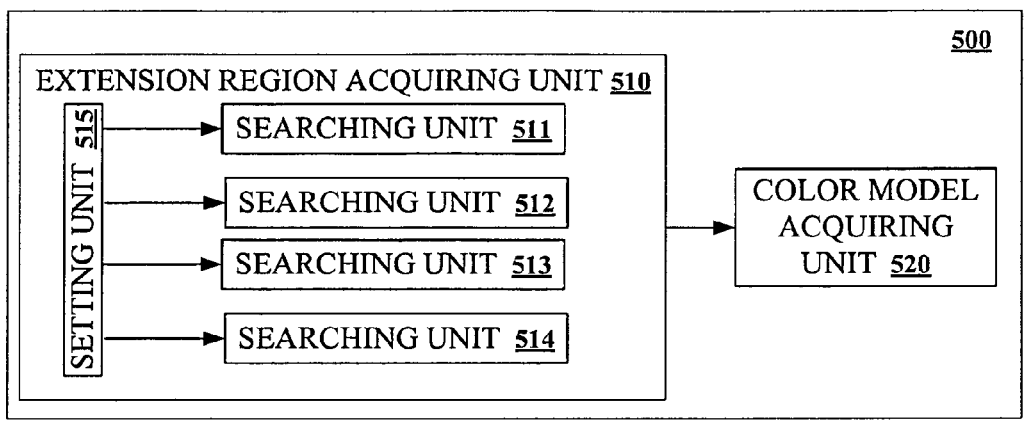
FIG. 5 is a block diagram illustrating an estimating unit in the image processing device according to the embodiment of the present disclosure.

The estimating unit 500 in the image processing device according to the embodiment of the present disclosure is described below in conjunction with FIG. 5. The estimating unit 50 shown in FIG. 5 corresponds to the estimating unit 230 shown in FIG. 2.

The estimating unit 500 may include an extension region acquiring unit 510 and a color model acquiring unit 520.

Figures 6A, 6B, 6C, 6D:
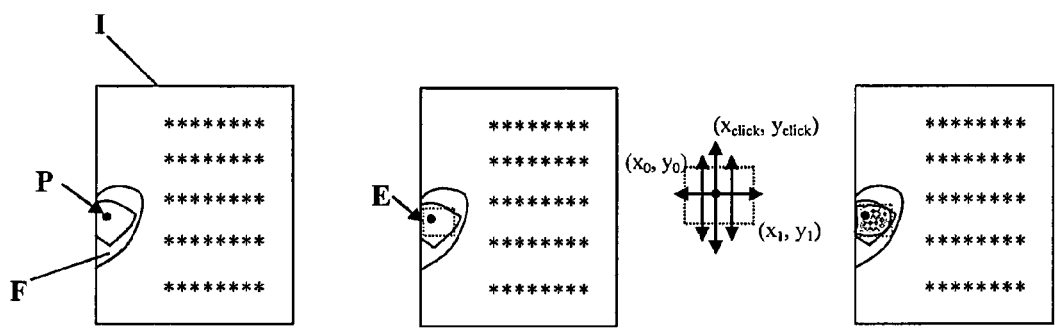
FIGS. 6(*a*) to 6(*d*) are schematic diagrams illustrating an exemplary application of an extension region acquiring unit in the estimating unit in the image processing device according to the embodiment of the present disclosure.

As shown in FIG. 6, for example, the extension region acquiring unit 510 may acquire an extension region containing the clicked point P based on the clicked point P and the edge map obtained by the calculating unit 220 (400), the extension region being within the finger image F. Specifically, the shaded part in FIG. 6(d) represents the extension region.

Further, the color model acquiring unit 520 may acquire the color model of the finger image F based on the color of each pixel within the extension region.

In order to obtain a stable and effective skin color model, generally many samples (i.e., pixels) are needed; but the user clicks only one point (i.e., the clicked point) in the finger image. In this case, more pixels are needed to be obtained for estimating the skin color model. Therefore, it is necessary that the extension region acquiring unit 510 acquires the extension region within the finger region F containing the clicked point P. Based on the color of each pixel within the extension region, instead of solely the color of the pixel at the clicked point P, the color model acquiring unit 520 can obtain a stable and effective color model of the finger image F.

Specifically, the extension region acquiring unit 510 may include a setting unit 515 and searching units 511-514.

The setting unit 515 may set a maximum extension region E containing the clicked point P, represented with dotted lines in FIG. 6(b). The searching unit 511 may search for the first one of boundary pixels leftward in a horizontal direction from the clicked point P, as a left boundary pixel of the extension region; and the searching unit 522 may search for the first one of the boundary pixels rightward in the horizontal direction from the clicked point P, as a right boundary pixel of the extension region.

For each reference pixel between the left boundary pixel and the right boundary pixel in the horizontal direction, the searching unit 513 may search for the first one of the boundary pixels upward in a vertical direction from the reference pixel, as an upper boundary pixel of the extension region; and the searching unit 514 may search for the first one of the boundary pixels downward in the vertical direction from the reference pixel, as a lower boundary pixel of the extension region.

Specifically, the extension region acquiring unit 510 sets a sliding window by taking each pixel within the maximum extension region E as the center, counts the number of edge pixels in the sliding window, and defines a pixel satisfying a condition that the number of the edge pixels in the sliding window is larger than a predetermined threshold as a boundary pixel.

Description is given in conjunction with FIGS. 6(a) to 6(c). Assuming the ranges of x and y coordinates of the maximum extension region E are [x0, x1] and [y0, y1], as shown in FIG. 6(c), the horizontal scope [$x_{0\text{-}ext}$, $x_{1\text{-}ext}$] of the extension region may be determined as follows. For a point ($x_{click\text{-}r}$, $y_{click}$) on the right of the clicked point P($x_{click}$, $y_{click}$) in the horizontal direction from the clicked point within the maximum extension region E where $x_{click} \leq x_{click\text{-}r} \leq x_1$, a sliding window is set by taking the point as the center, and the number of edge pixels in the sliding window is counted. Then, the searching unit 511 may detect from left to right the first pixel satisfying a condition where the number of the edge pixels in the sliding window is larger than a predetermined threshold, and designates the x coordinate of the detected pixel as $x_{1\text{-}ext}$. As a matter of course, it is possible that no edge pixel is found up to the right boundary pixel of the maximum extension region E. In this case, the x coordinate of the right boundary pixel of the maximum extension region E may be designated as $x_{1\text{-}ext}$.

Correspondingly, for a point ($x_{click\text{-}1}$, $y_{click}$) on the left of the clicked point P($x_{click}$, $y_{click}$) in the horizontal direction from the clicked point within the maximum extension region E where $x_0 \leq x_{click\text{-}1} \leq x_{click}$, a sliding window is set by taking the point as the center, and the number of edge pixels in the sliding window is counted. Then, the searching unit 512 may detect from right to left the first pixel satisfying a condition where the number of the edge pixels in the sliding window is larger than a predetermined threshold, and designates the x coordinate of the detected pixel as $x_{0\text{-}ext}$. As a matter of course, it is possible that no edge pixel is found up to the left boundary pixel of the maximum extension region E. In this case, the x coordinate of the left boundary pixel of the maximum extension region E may be designated as $x_{0\text{-}ext}$.

Upon determination of the horizontal scope [$x_{0\text{-}ext}$, $x_{1\text{-}ext}$] of the extension region, for each reference pixel (x, $y_{click}$) between the left boundary pixel and the right boundary pixel in the horizontal direction where $x_{0\text{-}ext} \leq x \leq x_{1\text{-}ext}$, the vertical scope [$y_{0\text{-}ext}$, $y_{1\text{-}ext}$] may be determined as follows. For a point (x, $y_{up}$) on the upper side of the reference point (x, $y_{click}$) in the vertical direction from the reference point within the maximum extension region E where $y_0 \leq y_{up} \leq y_{click}$, a sliding window is set by taking the point as the center, and the number of edge pixels in the sliding window is counted. Then, the searching unit 513 may detect from bottom to top the first pixel satisfying a condition where the number of the edge pixels in the sliding window is larger than a predetermined threshold, and designates the y coordinate of the detected pixel as $y_{0\text{-}ext}$. As a matter of course, it is possible that no edge pixel is found up to the upper boundary pixel of the maximum extension region E. In this case, the y coordinate of the upper boundary pixel of the maximum extension region E may be designated as $y_{0\text{-}ext}$.

Correspondingly, for a point (x, $y_{down}$) on the lower side of the reference point (x, $y_{click}$) in the vertical direction from the reference point within the maximum extension region E where $y_{click} \leq y_{down} \leq y_1$, a sliding window is set by taking the point as the center, and the number of edge pixels in the sliding window is counted. Then, the searching unit 514 may detect from top to bottom the first pixel satisfying a condition where the number of the edge pixels in the sliding window is larger than a predetermined threshold, and designates the y coordinate of the detected pixel as $y_{1\text{-}ext}$. As a matter of course, it is possible that no edge pixel is found up to the lower boundary pixel of the maximum extension region E. In this case, the y coordinate of the lower boundary pixel of the maximum extension region E may be designated as $y_{1\text{-}ext}$. In this way, the extension region within the finger region F containing the clicked point P is obtained.

It is noted that in the technical solution described above, the horizontal scope [$x_{0\text{-}ext}$, $x_{1\text{-}ext}$] of the extension region is determined first; and then the vertical scope [$y_{0\text{-}ext}$, $y_{1\text{-}ext}$] of the extension region is determined. However, the present disclosure is not limited to this. For example, the vertical scope [$y_{0\text{-}ext}$, $y_{1\text{-}ext}$] of the extension region may be determined first; and then the horizontal scope [$x_{0\text{-}ext}$, $x_{1\text{-}ext}$] of the extension region may be determined. The determination method thereof is similar to those described above, and thus omitted herein.

Upon obtaining the extension region within the finger region F containing the clicked point P, the color model acquiring unit 520 may acquire the color model of the finger image. For example, the color model of the finger image may be obtained by means of Gaussian Mixture Model, skin color threshold, histogram model with Bayes classifiers, etc. A specific exemplary method for obtaining the color model is given below. Those skilled in the art shall understand that other methods that are different from the specific exemplary method may also be used for obtaining the color model.

Multiple Gaussian models are used here because the finger color may consist of multiple color centers. Assuming any point in the extension region is represented as ($x_i$, $y_i$) where $0 \leq i \leq N-1$, and N denotes the number of pixels in the extension region. The color characteristic of each point ($x_i$, $y_i$) in the extension region may be represented as a two-dimensional vector $f_i = (r'_i, g'_i)$. $r'_i$ and $g'_i$ may be calculated by:

$$r'_i = \frac{r_i}{r_i + g_i + b_i} \quad (4)$$

$$g'_i = \frac{g_i}{r_i + g_i + b_i} \quad (5)$$

where $r_i$, $g_i$ and $b_i$ denote r, g and b values of the pixel ($x_i$, $y_i$), respectively.

In order to obtain multiple color centers, K-means Clustering algorithm may be used to obtain K clusters.

In order to obtain multiple color centers, the K-means Clustering algorithm may be applied to the pixels in the extension region, so that the pixels in the extension region are clustered into K clusters ($w_i$, $C_i$), where $0 \leq i \leq K-1$, and N is a natural number. Specifically, $w_i$ denotes the weight of a cluster $C_i$ and equals the ratio of the number of pixels in the cluster $C_i$ to the number of all the pixels in the extension region.

For each cluster $C_i$, the pixels in the cluster are used to calculate a mean vector $\overline{m}_i$ and a covariance matrix $S_i$ of the color characteristics of the pixels clustered in the cluster as follows:

$$\overline{m}_i = \frac{1}{Num_i} \sum_{i \in C_i} f_i \quad (6)$$

$$S_i = \frac{1}{Num_i} \sum_{i \in C_i} (f_i - \overline{m}_i)(f_i - \overline{m}_i)^T \quad (7)$$

where $Num_i$ denotes the number of the pixels in the cluster $C_i$.

Then, based on the mean vector $\overline{m}_k$ and the covariance matrix $S_k$ of the color characteristics of the pixels in any cluster $C_k$, the Mahalanobis distance Ma–d(i,j,$C_k$) between the color characteristic of each pixel (i, j) in the extension region and any cluster $C_k$ may be calculated by:

$$Ma-d(i,j,C_k)=(f_{i,j}-\overline{m_k})^T S_k^{-1}(f_{i,j}-\overline{m_k}) \quad (8)$$

Further, based on the weight $w_k$ of each cluster $C_k$ in the extension region, a weighted Mahalanobis distance d(i, j) between the color characteristic of each pixel (i, j) in the extension region and K clusters may be calculated by:

$$d(i,j) = \sum_{k=0}^{K-1} w_k * Ma - d(i,j,C_k) \quad (9)$$

Furthermore, a predetermined threshold which causes the ratio of the number of pixels having a weighted Mahalanobis distance smaller than the predetermined threshold to the number of all the pixels in the extension region to be equal to a setting ratio may be determined as the color threshold $T_{color}$.

Specifically, the distances d(i, j) of the pixels may be sorted from smallest to largest, and the color threshold may be selected according to a setting ratio $\zeta$ (e.g., 0.98). For example, the color threshold is selected such that the ratio of the number of pixels smaller than the predetermined threshold to the number of all the pixels in the extension region is equal to the setting ratio $\zeta$. Finally, the estimated color model includes K Gaussian models $(w_i, \overline{m_i}, S_i)$ (0≤i≤K−1) and the color threshold $T_{color}$.

As described above referring to FIG. 2, the object classifying unit 240 may classify each pixel in the image I, based on the edge map of the image I and the color model of the finger image, so as to obtain the binary image of the image I.

Specifically, the object classifying unit 240 may classify pixels in the image I that are non-edge pixels in the edge map and have a distance from the color model smaller than the color threshold as finger (object) pixels, and the other pixels in the image I as non-finger (non-object) pixels.

More specifically, for example, according to the estimated color model and the enhanced edge map described above, the object classifying unit 240 may classify each pixel (i, j) in the image I as follows. First, the color characteristic vector of the pixel (i, j) is calculated according to equations (4) and (5). Then, the distance between the pixel (i, j) and the color model is calculated according to equations (8) and (9). Finally, the pixel (i, j) is classified according to the equation (10):

$$\text{Label}(i,j) = \begin{cases} 0 & \text{if } Edge_{enhance}(i,j) = 255 \text{ and } d(i,j) \leq T_{color} \\ 255 & \text{if } Edge(i,j) = 0 \text{ or } d(i,j) > T_{color} \end{cases} \quad (10)$$

where $Edge_{enhance}(i,j)$ can be calculated by equation (3), and d(i, j) can be calculated by equation (9).

By these operations, the binary image of the image I including pixels with values being 0 or 255 only may be obtained. Specifically, value 0 shows that the pixel is closer to a finger pixel, while value 255 shows that the pixel is closer to a non-finger pixel.

The detecting unit 700 of the image processing device according to an embodiment of the present disclosure is described below in conjunction with FIG. 7. The detecting unit 700 shown in FIG. 7 corresponds to the detecting unit 250 shown in FIG. 2.

Figure 7:
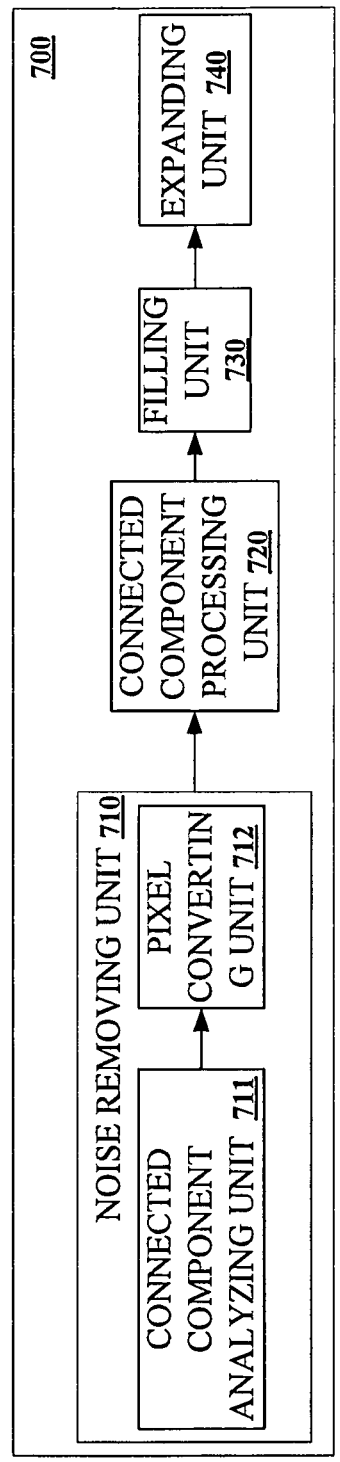
FIG. 7 is a block diagram illustrating a detecting unit in the image processing device according to the embodiment of the present disclosure.

As shown in FIG. 7, the detecting unit 700 may include a noise removing unit 710 for removing noise component in the binary image.

Due to the variety of types of book contents, in the binary image obtained by the object classifying unit, some non-finger pixels may be classified as finger pixels, resulting in noise pixels. Therefore, it is necessary to remove the noise pixels.

Specifically, the noise removing unit 710 may set a sliding window in the binary image, and count the number of finger pixels (i.e., pixels whose pixel values are 0) in the sliding window. If the number of finger pixels in the sliding window is smaller than a predetermined threshold, it is determined that the finger pixels are actually noise pixels and the pixels are set as non-finger pixels, i.e., the values of the pixels are converted from 0 into 255.

Alternatively or additionally, the noise removal unit 710 may include a connected component analyzing unit 711 and a pixel converting unit 712. The connected component analyzing unit 711 may perform connected component analysis (CCA) on the binary image, so as to obtain a connected component in the binary image, each pixel in the connected component being a finger pixel. CCA algorithms are well-known in the prior art, and thus omitted herein.

For each obtained connected component, the pixel converting unit 712 may convert all the finger pixels in the connected component into non-finger pixels if the connected component satisfies any of the conditions:

1) the area of the connected component is less than a predetermined area;

2) the aspect ratio of the connected component is larger than a predetermined ratio;

3) the finger image is on the left side of the image, and the distance between a left boundary of the connected component and a left boundary of the image is larger than a predetermined threshold; or 4) the finger image is on the right side of the image, and the distance between a right boundary of the connected component and a right boundary of the image is larger than the predetermined threshold.

Figures 8A, 8B, 8C, 8D:
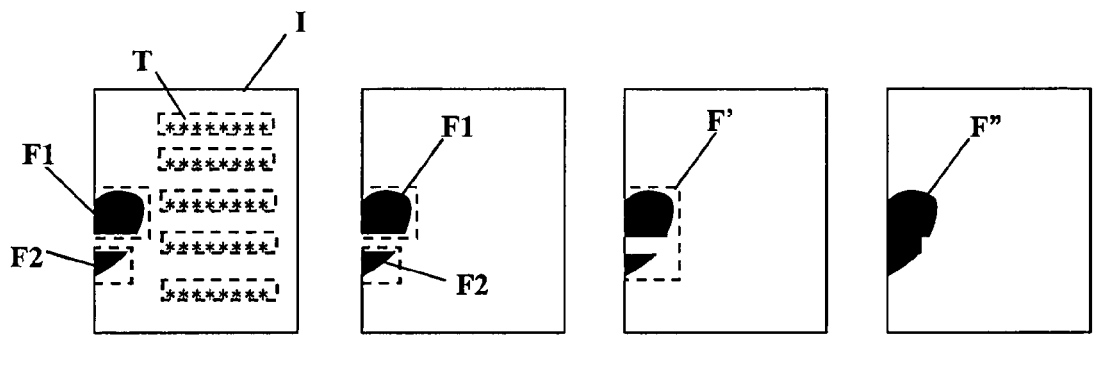
FIGS. 8(*a*) to 8(*d*) are schematic diagrams illustrating an exemplary application of the detecting unit in the image processing device according to the embodiment of the present disclosure.

The four conditions above are explained below. First, regarding condition 1), the finger image takes a certain area; and when the area of the connected component is too small, the connected component is unlikely to be the finger image, instead, it may be a noise component. Further, regarding condition 2), the finger image has a certain aspect ratio. As shown in FIG. 8(a), when the aspect ratio is too large, the connected component is more likely to be a noise component such as book content T, and unlikely to be the finger image F1 or F2.

Further, regarding conditions 3) and 4), generally the finger is located on a vertical boundary of the image. When the connected component is away from the vertical boundary and close to the middle of the image, it is unlikely to be the finger image. Instead, it may be a noise component.

In addition, as shown in FIG. 7, the detecting unit 700 may further include a connected component processing unit 720 and a filling unit 730. As shown in FIGS. 8(b), 8(c) and 8(d), the connected component processing unit 720 may, according to the clicked point, acquire a connected component F1 where the clicked point is located, and search for a nearby connected component F2 in a vertical direction. The filling unit 730 may perform filling operation on the connected component F1 containing the clicked point and the found connected component F2 (i.e., region F'), thereby obtaining a filled connected component F".

Considering that, during pixel classification, the finger image may be classified into multiple separate parts (e.g., F1 and F2 shown in FIG. 8(a) and FIG. 8(b)), the connected component F1 containing the clicked point is combined with the nearby connected component F2 in a vertical direction from F1. Moreover, due to the possible holes in the detected finger image, the filling operation may be used to fill the holes. Specifically, for each column of the image I, the upper most and lower most finger pixels (i.e., pixels whose pixel values are 0) are detected, and then all pixels between the two pixels are set as finger pixels. After the filling operation, the hole regions on the finger are filled, as shown in FIG. 8(d).

Figure 9:
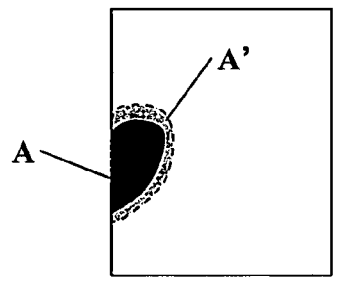
FIG. 9 is a schematic diagram illustrating an exemplary application of an expanding unit in the detecting unit in the image processing device according to the embodiment of the present disclosure.

In addition, as shown in FIG. 7, the detecting unit 700 may further include an expanding unit 740 for performing an expanding operation on the filled connected component in the binary image. As shown in FIG. 9, because the boundary of the finger image may not be contained in the detected finger region A, it is necessary to perform an expanding operation so as to expand the finger region A into a region A'. Specific methods for the expanding operation are well-known in the prior art, and the present disclosure has no particular limitations thereto.

Description is given above taking the finger image as an example. According to the embodiments of the present disclosure, both the color model of the finger image and the edge map of the image are used to obtain the binary image of the image. Further, both the information on the clicked point and the edge map of the image are used to estimate the color model of the finger image. Therefore, the accuracy of detecting the finger region can be greatly improved, thus facilitating removal of the finger image from the image and making the processed image more nice-looking.

Figure 10:
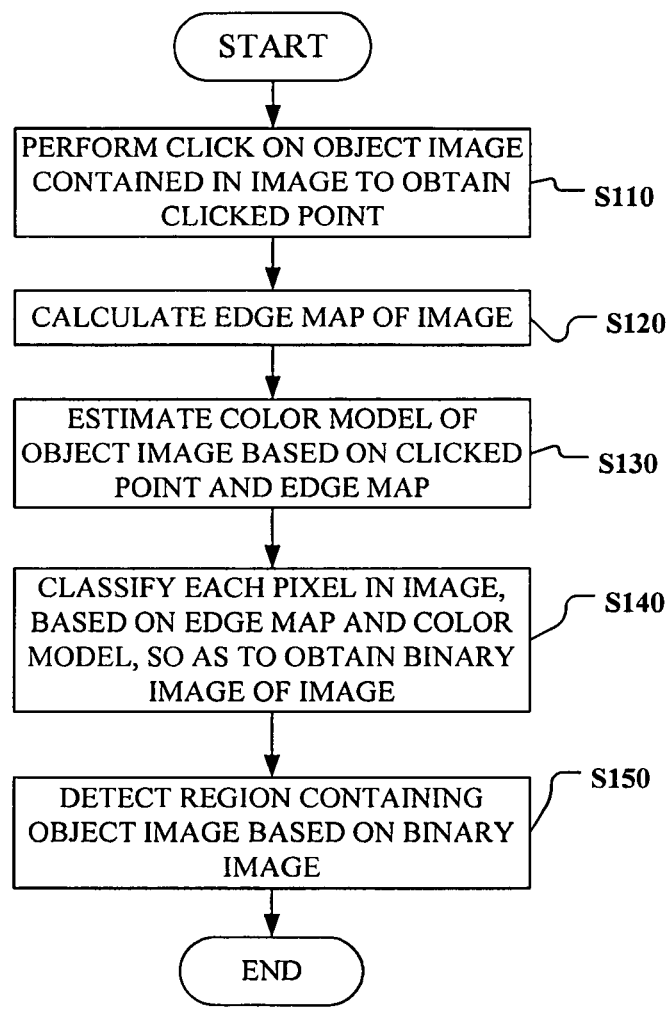
FIG. 10 is a flowchart of an image processing method according to an embodiment of the present disclosure.

The image processing method according to an embodiment of the present disclosure will be described hereinafter in conjunction with FIG. 10. As shown in FIG. 10, the image processing method according to the embodiment of the present disclosure starts at step S110. In step S110, a click is performed on an object image contained in an image to obtain a clicked point.

Next, in step S120, an edge map of the image is calculated.

Next, in step S130, a color model of the object image is estimated based on the clicked point and the edge map.

Next, in step S140, each pixel in the image is classified based on the edge map and the color model, so as to obtain a binary image of the image.

Finally, in step S150, a region containing the object image is detected based on the binary image.

According to an embodiment of the present invention, in calculating the edge map of the image in step S120, the distance between the color of each pixel in the image and the color of the clicked point may be calculated to obtain a distance map. Then, a gradient operator may be applied to the distance map to obtain a distance gradient image. If a pixel in the image has a distance gradient larger than a predetermined distance gradient threshold, the pixel is classified as an edge pixel; otherwise, the pixel is classified as a non-edge pixel.

According to an embodiment of the present invention, in calculating the edge map of the image in step S120, the distance between the color of each pixel in the image and the color of the clicked point may be calculated to obtain a distance map. Then, a gradient operator may be applied to the distance map to obtain a distance gradient image. Further, the image may be converted from a color image into a gray image, and a gradient operator may be applied to the gray image to obtain an intensity gradient image. If a pixel in the image has a distance gradient larger than a predetermined distance gradient threshold or has an intensity gradient larger than a predetermined intensity gradient threshold, the pixel is classified as an edge pixel; otherwise, the pixel is classified as a non-edge pixel.

According to an embodiment of the present invention, in estimating the color model of the object in step S130, an extension region containing the clicked point may be acquired based on the clicked point and the edge map, the extension region being within the object image. Then, the color model of the object image may be acquired based on a color of each pixel within the extension region.

Specifically, in acquiring the extension region containing the clicked point, a maximum extension region containing the clicked point may be set. Then, the first one of boundary pixels leftward in a horizontal direction from the clicked point may be searched for, as a left boundary pixel of the extension region; and the first one of the boundary pixels rightward in the horizontal direction from the clicked point may be searched for, as a right boundary pixel of the extension region.

Further, for each reference pixel between the left boundary pixel and the right boundary pixel in the horizontal direction, the first one of the boundary pixels upward in a vertical direction from the reference pixel may be searched for, as an upper boundary pixel of the extension region; and the first one of the boundary pixels downward in the vertical direction from the reference pixel may be searched for, as an lower boundary pixel of the extension region.

Specifically, for each pixel within the maximum extension region, a sliding window is set taking the pixel as the center, the number of edge pixels in the sliding window is counted, and a pixel satisfying a condition that the number of the edge pixels in the sliding window is larger than a predetermined threshold is defined as a boundary pixel.

According to an embodiment of the present disclosure, in classifying each pixel in the image in step S140, if a pixel in the image is a non-edge pixel in the edge map and has a distance from the color model less than a color threshold, the pixel is classified as an object pixel; otherwise, the pixel is classified as a non-object pixel.

According to an embodiment of the present disclosure, in detecting the region containing the object image in step S150, a noise component in the binary image may be removed.

Specifically, in removing the noise component in the binary image, connected component analysis may be performed on the binary image, so as to obtain a connected component in the binary image, each of pixels in the connected component being an object pixel. And each object pixel in the connected component is converted into a non-object pixel if the connected component satisfies any of the conditions of:

1) the area of the connected component being less than a predetermined area;

2) the aspect ratio of the connected component being larger than a predetermined ratio;

3) the object image being on the left side of the image and the distance between a left boundary of the connected component and a left boundary of the image being larger than a predetermined threshold; or 4) the object image being on the right side of the image and the distance between a right boundary of the connected component and a right boundary of the image being larger than the predetermined threshold.

According to an embodiment of the present disclosure, in detecting the region containing the object image in step S150, a connected component where the clicked point is located may be acquired according to the clicked point, and a nearby connected component is searched for in a vertical direction. Then, a filling operation may be performed on the connected component containing the clicked point and the found connected component, thereby obtaining a filled connected component.

According to an embodiment of the present disclosure, in detecting the region containing the object image in step S150, an expanding operation may further be performed on the filled connected component in the binary image.

The various specific implementations of the respective steps above of the image processing method according to the embodiments of the present disclosure have been described in detail previously, and therefore the explanations thereof will not be repeated herein.

Apparently, respective operating processes of the image processing method above according to the present disclosure can be implemented in a manner of a computer executable program stored on a machine-readable storage medium.

And, the object of the present disclosure can be implemented in a manner that the storage medium on which the computer executable program above is carried is provided directly or indirectly to a system or apparatus, a computer or a Central Processing Unit (CPU) of which reads out and executes the computer executable program. Here, the implementation of the present disclosure is not limited to a program as long as the system or apparatus has a function to execute the program, and the program can be in arbitrary forms such as an objective program, a program executed by an interpreter, a script program provided to an operating system, etc.

The machine-readable storage medium mentioned above includes, but is not limited to, various memories and storage devices, a semiconductor device, a disk unit such as an optic disk, a magnetic disk and a magneto-optic disk, and other medium suitable for storing information.

Additionally, the present disclosure can also be implemented by connecting to a corresponding web site on the Internet through a computer, downloading and installing the computer executable program according to the invention into the computer, and then executing the program.

Figure 11:
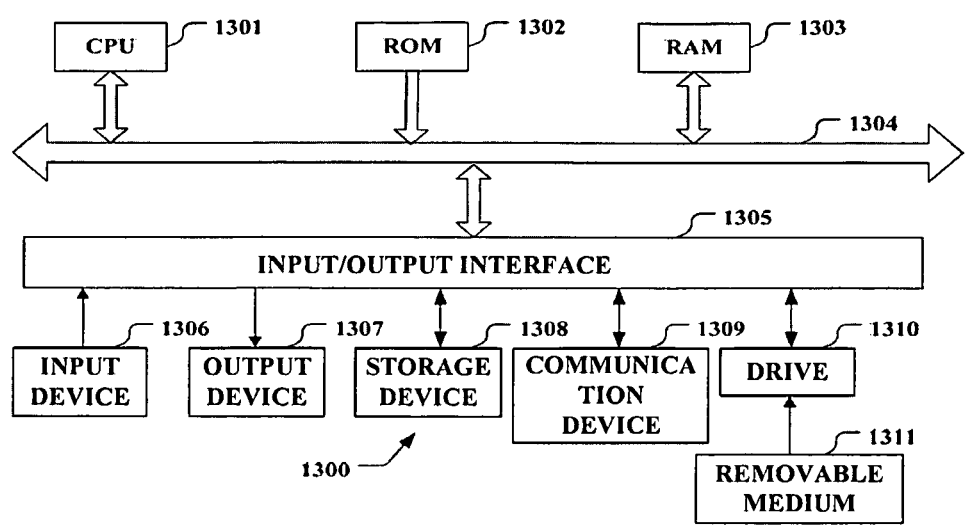
FIG. 11 is a block diagram illustrating an exemplary structure of a general-purpose personal computer on which the image processing device and method according to the embodiments of the present disclosure can be implemented.

FIG. 11 is a block diagram illustrating an exemplary structure of a general-purpose personal computer on which the image processing device and method according to the embodiments of the present disclosure can be implemented.

As shown in FIG. 11, a CPU 1301 executes various processing according to a program stored in a Read Only Memory (ROM) 1302 or a program loaded to a Random Access Memory (RAM) 1303 from a storage device 1308. In the RAM 1303, if necessary, data required for the CPU 1301 in executing various processing and the like is also stored. The CPU 1301, the ROM 1302 and the RAM 1303 are connected to each other via a bus 1304. An input/output interface 1305 is also connected to the bus 1304.

The following components are connected to the input/output interface 1305: an input device 1306 including a keyboard, a mouse and the like, an output device 1307 including a display such as a Cathode Ray Tube (CRT) and a Liquid Crystal Display (LCD), a speaker and the like, the storage device 1308 including a hard disk and the like, and a communication device 1309 including a network interface card such as a LAN card, a modem and the like. The communication device 1309 performs communication processing via a network such as the Internet. If necessary, a drive 1310 can also be connected to the input/output interface 1305. A removable medium 1311 such as a magnetic disk, an optical disk, a magneto-optical disk, a semiconductor memory and the like is mounted on the drive 1310 as necessary such that a computer program read out therefrom is installed in the storage device 1308.

In a case that the series of processing above is implemented in software, a program constituting the software is installed from the network such as the Internet or the storage medium such as the removable medium 1311.

It is understood by those skilled in the art that the storage medium is not limited to the removable medium 1311 shown in FIG. 11 in which the program is stored and which is distributed separately from the device so as to provide the program to the user. Examples of the removable medium 1311 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1302, the hard disk contained in the storage device 1308 or the like. Herein, the program is stored in the storage medium, and the storage medium is distributed to the user together with the device containing the storage medium.

In the system and method of the present disclosure, it is obvious that respective components or steps can be decomposed and/or recombined. Such decomposition and/or recombination should be considered as an equivalent solution of the present disclosure. And, the steps performing a series of processing above can be performed in the describing order naturally, but this is not necessary. Some steps can be performed concurrently or independently with one another.

Although the embodiment of the present disclosure has been described in detail in combination with the drawings above, it should be understood that, the embodiment described above is only used to explain the invention and is not constructed as the limitation to the present disclosure. For those skilled in the art, various modification and alternation can be made to the above embodiment without departing from the essential and scope of the present disclosure. Therefore, the scope of the present disclosure is only defined by the appended claims and the equivalents thereof.

The present disclosure discloses the embodiments described above as well as the following appendix:

APPENDIX 1

An image processing device comprising:
an inputting unit for performing a click on an object image contained in an image to obtain a clicked point;
a calculating unit for calculating an edge map of the image;
an estimating unit for estimating a color model of the object image based on the clicked point and the edge map;
an object classifying unit for classifying each pixel in the image, based on the edge map and the color model, so as to obtain a binary image of the image; and
a detecting unit for detecting a region containing the object image based on the binary image.

APPENDIX 2

The device according to Appendix 1, wherein the calculating unit comprises:
a distance calculating unit for calculating a distance between a color of each pixel in the image and a color of the clicked point to obtain a distance map;
a distance gradient calculating unit for applying a gradient operator to the distance map to obtain a distance gradient image; and
an edge classifying unit for classifying a pixel having a distance gradient larger than a predetermined distance gradient threshold in the image into an edge pixel, and the other pixel in the image into a non-edge pixel.

APPENDIX 3

The device according to Appendix 1, wherein the calculating unit comprises:
a distance calculating unit for calculating a distance between a color of each pixel in the image and a color of the clicked point to obtain a distance map;

a distance gradient calculating unit for applying a gradient operator to the distance map to obtain a distance gradient image;

a gray converting unit for converting the image from a color image to a gray image;

an intensity gradient calculating unit for applying a gradient operator to the gray image to obtain an intensity gradient image; and an edge classifying unit for classifying a pixel having a distance gradient larger than a predetermined distance gradient threshold or having an intensity gradient larger than a predetermined intensity gradient threshold in the image into an edge pixel, and the other pixel in the image into a non-edge pixel.

APPENDIX 4

The device according to Appendix 1, wherein the estimating unit comprises:

an extension region acquiring unit for acquiring an extension region containing the clicked point based on the clicked point and the edge map, the extension region being within the object image; and a color model acquiring unit for acquiring the color model of the object image based on a color of each pixel within the extension region.

APPENDIX 5

The device according to Appendix 4, wherein the extension region acquiring unit comprises:

a setting unit for setting a maximum extension region containing the clicked point;

a first searching unit for searching, as a left boundary pixel of the extension region, the first one of boundary pixels leftward in a horizontal direction from the clicked point;

a second searching unit for searching, as a right boundary pixel of the extension region, the first one of the boundary pixels rightward in the horizontal direction from the clicked point;

a third searching unit for searching, for each reference pixel between the left boundary pixel and the right boundary pixel in the horizontal direction, as an upper boundary pixel of the extension region, the first one of the boundary pixels upward in a vertical direction from the reference pixel; and a fourth searching unit for searching, as an lower boundary pixel of the extension region, the first one of the boundary pixels downward in the vertical direction from the reference pixel, wherein, the extension region acquiring unit sets a sliding window taking each pixel within the maximum extension region as a center, counts the number of edge pixels in the sliding window, and defines a pixel satisfying a condition that the number of the edge pixels in the sliding window is larger than a predetermined threshold as the boundary pixel.

APPENDIX 6

The device according to Appendix 1, wherein the object classifying unit classifies a pixel in the image which is a non-edge pixel in the edge map and a distance from the color model is less than a color threshold into an object pixel, and the other pixel in the image into a non-object pixel.

APPENDIX 7

The device according to Appendix 1, wherein the detecting unit comprises a noise removing unit for removing noise component in the binary image.

APPENDIX 8

The device according to Appendix 7, wherein the noise removing unit comprises:

a connected component analyzing unit for performing connected component analysis algorithm on the binary image, so as to obtain a connected component in the binary image, each of pixels in the connected component being an object pixel; and a pixel converting unit for converting each object pixel in the connected component into a non-object pixel if the connected component satisfies any of conditions of:

an area of the connected component being less than a predetermined area;

an aspect ratio of the connected component being larger than a predetermined ratio;

the object image being on the left side of the image and a distance between a left boundary of the connected component and a left boundary of the image being larger than a predetermined threshold; or the object image being on the right side of the image and a distance between a right boundary of the connected component and a right boundary of the image being larger than the predetermined threshold.

APPENDIX 9

The device according to Appendix 8, wherein the detecting unit further comprises:

a connected component processing unit for acquiring a connected component where the clicked point locates according to the clicked point and searching a nearby connected component in a vertical direction; and a filling unit for performing filling operation on the connected component containing the clicked point and the searched connected component, so as to obtain the filled connected component.

APPENDIX 10

The device according to Appendix 9, wherein the detecting unit further comprises:

an expanding unit for performing an expanding operation on the filled connected component in the binary image.

APPENDIX 11

The device according to Appendix 1, wherein the object image is a finger image.

APPENDIX 12

The device according to Appendix 1, wherein the color of the clicked point is the color of a pixel at the clicked point, or an average color of pixels within a predetermined region containing the clicked point.

APPENDIX 13

An image processing method comprising:

performing a click on an object image contained in an image to obtain a clicked point;

calculating an edge map of the image;

estimating a color model of the object image based on the clicked point and the edge map;

classifying each pixel in the image, based on the edge map and the color model, so as to obtain a binary image of the image; and detecting a region containing the object image based on the binary image

APPENDIX 14

The method according to Appendix 13, wherein the step of calculating an edge map of the image comprises:

calculating a distance between a color of each pixel in the image and a color of the clicked point to obtain a distance map;

applying a gradient operator to the distance map to obtain a distance gradient image; and classifying a pixel having a distance gradient larger than a predetermined distance gradient threshold in the image into an edge pixel, and the other pixel in the image into a non-edge pixel.

APPENDIX 15

The method according to Appendix 13, wherein the step of calculating an edge map of the image comprises:

calculating a distance between a color of each pixel in the image and a color of the clicked point to obtain a distance map;

applying a gradient operator to the distance map to obtain a distance gradient image;

converting the image from a color image to a gray image;

applying a gradient operator to the gray image to obtain an intensity gradient image; and classifying a pixel having a distance gradient larger than a predetermined distance gradient threshold or having an intensity gradient larger than a predetermined intensity gradient threshold in the image into an edge pixel, and the other pixel in the image into a non-edge pixel.

APPENDIX 16

The method according to Appendix 13, wherein the step of estimating a color model of the object image based on the clicked point and the edge map comprises:

acquiring an extension region containing the clicked point based on the clicked point and the edge map, the extension region being within the object image; and acquiring the color model of the object image based on a color of each pixel within the extension region.

APPENDIX 17

The method according to Appendix 16, wherein the step of acquiring an extension region containing the clicked point based on the clicked point and the edge map comprises:

setting a maximum extension region containing the clicked point;

searching, as a left boundary pixel of the extension region, the first one of boundary pixels leftward in a horizontal direction from the clicked point;

searching, as a right boundary pixel of the extension region, the first one of the boundary pixels rightward in the horizontal direction from the clicked point; and setting, for each reference pixel between the left boundary pixel and the right boundary pixel in the horizontal direction, an upper boundary pixel and a lower boundary pixel of the extension region by steps of:

searching, as the upper boundary pixel of the extension region, the first one of the boundary pixels upward in a vertical direction from the reference pixel; and searching, as the lower boundary pixel of the extension region, the first one of the boundary pixels downward in the vertical direction from the reference pixel, wherein, a sliding window is set taking each pixel within the maximum extension region as a center, the number of edge pixels in the sliding window is counted, and a pixel satisfying a condition that the number of the edge pixels in the sliding window is larger than a predetermined threshold is defined as the boundary pixel.

APPENDIX 18

The method according to Appendix 13, wherein the step of classifying each pixel in the image based on the edge map and the color model so as to obtain a binary image of the image comprises:

classifying a pixel in the image which is a non-edge pixel in the edge map and a distance from the color model is less than a color threshold into an object pixel, and the other pixel in the image into a non-object pixel.

APPENDIX 19

A program product comprising a machine-readable instruction code stored therein, wherein the instruction code, when read and executed by a computer, enables the computer to execute the method according to any of Appendixes 13-18.

APPENDIX 20

A machine-readable medium on which the program product according to Appendix 19 is carried.

The invention claimed is:

1. An image processing device comprising a processor configured to:

perform a click on an object image contained in an image to obtain a clicked point;

calculate an edge map of the image;

a color model of the object image based on the clicked point and the edge map;

classify each pixel in the image, based on the edge map and the color model, so as to obtain a binary image of the image; and a region containing the object image based on the binary image, wherein the processor is further configured to acquire an extension region containing the clicked point based on the clicked point and the edge map, the extension region being within the object image; and acquire the color model of the object image based on a color of each pixel within the extension region, wherein the processor is further configured to:

set a maximum extension region containing the clicked point, search, as a left boundary pixel of the extension region, the first one of boundary pixels leftward in a horizontal direction from the clicked point, search, as a right boundary pixel of the extension region, the first one of the boundary pixels rightward in the horizontal direction from the clicked point, search, for each reference pixel between the left boundary pixel and the right boundary pixel in the horizontal direction, as an upper boundary pixel of the extension region, the first one of the boundary pixels upward in a vertical direction from the reference pixel; and search, as an lower boundary pixel of the extension region, the first one of the boundary pixels downward in the vertical direction from the reference pixel, wherein the processor is further configured to set a sliding window taking each pixel within the maximum extension region as a center, count the number of edge pixels in the sliding window, and define a pixel satisfying a condition that the number of the edge pixels in the sliding window is larger than a predetermined threshold as the boundary pixel.

2. The device according to claim 1, wherein the processor is further configured to:

calculate a distance between a color of each pixel in the image and a color of the clicked point to obtain a distance map;

a gradient operator to the distance map to obtain a distance gradient image; and classify a pixel having a distance gradient larger than a predetermined distance gradient threshold in the image into an edge pixel, and the other pixel in the image into a non-edge pixel.

3. The device according to claim 1, wherein the processor is further configured to:

calculate a distance between a color of each pixel in the image and a color of the clicked point to obtain a distance map;

apply a gradient operator to the distance map to obtain a distance gradient image;

convert the image from a color image to a gray image;

apply a gradient operator to the gray image to obtain an intensity gradient image; and classify a pixel having a distance gradient larger than a predetermined distance gradient threshold or having an intensity gradient larger than a predetermined intensity gradient threshold in the image into an edge pixel, and the other pixel in the image into a non-edge pixel.

4. The device according to claim 1, wherein the processor is further configured to classify a pixel in the image which is a non-edge pixel in the edge map and a distance from the color model is less than a color threshold into an object pixel, and the other pixel in the image into a non-object pixel.

5. The device according to claim 1, wherein the processor is further configured to remove noise component in the binary image.

6. The device according to claim 5, wherein the processor is further configured to:

perform connected component analysis algorithm on the binary image, so as to obtain a connected component in the binary image, each of pixels in the connected component being an object pixel; and convert each object pixel in the connected component into a non-object pixel if the connected component satisfies any of conditions of:

an area of the connected component being less than a predetermined area;

an aspect ratio of the connected component being larger than a predetermined ratio;

the object image being on the left side of the image and a distance between a left boundary of the connected component and a left boundary of the image being larger than a predetermined threshold; or the object image being on the right side of the image and a distance between a right boundary of the connected component and a right boundary of the image being larger than the predetermined threshold.

7. The device according to claim 6, wherein the processor is further configured to:

acquire a connected component where the clicked point locates according to the clicked point and search a nearby connected component in a vertical direction; and perform filling operation on the connected component containing the clicked point and the searched connected component, so as to obtain the filled connected component.

8. The device according to claim 7, wherein the processor is further configured to:

perform an expanding operation on the filled connected component in the binary image.

9. The device according to claim 1, wherein the object image is a finger image.

10. The device according to claim 1, wherein the color of the clicked point is the color of a pixel at the clicked point, or an average color of pixels within a predetermined region containing the clicked point.

11. An image processing method comprising:

performing a click on an object image contained in an image to obtain a clicked point;

calculating an edge map of the image;

estimating a color model of the object image based on the clicked point and the edge map;

classifying each pixel in the image, based on the edge map and the color model, so as to obtain a binary image of the image; and detecting a region containing the object image based on the binary image, wherein the step of estimating a color model of the object image based on the clicked point and the edge map comprises:

acquiring an extension region containing the clicked point based on the clicked point and the edge map, the extension region being within the object image; and acquiring the color model of the object image based on a color of each pixel within the extension region, wherein the step of acquiring an extension region containing the clicked point based on the clicked point and the edge map comprises:

setting a maximum extension region containing the clicked point;

searching, as a left boundary pixel of the extension region, the first one of boundary pixels leftward in a horizontal direction from the clicked point;

searching, as a right boundary pixel of the extension region, the first one of the boundary pixels rightward in the horizontal direction from the clicked point; and setting, for each reference pixel between the left boundary pixel and the right boundary pixel in the horizontal direction, an upper boundary pixel and a lower boundary pixel of the extension region by steps of:

searching, as the upper boundary pixel of the extension region, the first one of the boundary pixels upward in a vertical direction from the reference pixel; and searching, as the lower boundary pixel of the extension region, the first one of the boundary pixels downward in the vertical direction from the reference pixel, wherein, a sliding window is set taking each pixel within the maximum extension region as a center, the number of edge pixels in the sliding window is counted, and a pixel satisfying a condition that the number of the edge pixels in the sliding window is larger than a predetermined threshold is defined as the boundary pixel.

12. The method according to claim 11, wherein the step of calculating an edge map of the image comprises:

calculating a distance between a color of each pixel in the image and a color of the clicked point to obtain a distance map;
applying a gradient operator to the distance map to obtain a distance gradient image; and
classifying a pixel having a distance gradient larger than a predetermined distance gradient threshold in the image into an edge pixel, and the other pixel in the image into a non-edge pixel.

13. The method according to claim 11, wherein the step of calculating an edge map of the image comprises:
calculating a distance between a color of each pixel in the image and a color of the clicked point to obtain a distance map;
applying a gradient operator to the distance map to obtain a distance gradient image;
converting the image from a color image to a gray image;
applying a gradient operator to the gray image to obtain an intensity gradient image; and
classifying a pixel having a distance gradient larger than a predetermined distance gradient threshold or having an intensity gradient larger than a predetermined intensity gradient threshold in the image into an edge pixel, and the other pixel in the image into a non-edge pixel.

14. The method according to claim 11, wherein the step of classifying each pixel in the image based on the edge map and the color model so as to obtain a binary image of the image comprises:
classifying a pixel in the image which is a non-edge pixel in the edge map and a distance from the color model is less than a color threshold into an object pixel, and the other pixel in the image into a non-object pixel.

15. A non-transitory computer-readable storage medium stored a computer program, the program comprising instruction code readable and executable by a computer to enables the computer to execute the method according to claim 11.

* * * * *